(12) United States Patent
Shinozaki et al.

(10) Patent No.: US 10,050,277 B2
(45) Date of Patent: Aug. 14, 2018

(54) ELECTROLYTIC COPPER FOIL, NEGATIVE ELECTRODE FOR LITHIUM ION SECONDARY BATTERY, AND LITHIUM ION SECONDARY BATTERY

(71) Applicant: Furukawa Electric Co., Ltd., Tokyo (JP)

(72) Inventors: Jun Shinozaki, Tokyo (JP); Kimiko Fujisawa, Tokyo (JP); Akira Tachibana, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 14/425,346

(22) PCT Filed: Jun. 25, 2013

(86) PCT No.: PCT/JP2013/067379
§ 371 (c)(1),
(2) Date: May 21, 2015

(87) PCT Pub. No.: WO2014/002996
PCT Pub. Date: Jan. 3, 2014

(65) Prior Publication Data
US 2016/0013493 A1     Jan. 14, 2016

(30) Foreign Application Priority Data

Jun. 27, 2012  (JP) .................................. 2012-144608

(51) Int. Cl.
| | | |
|---|---|---|
| *B21C 37/00* | (2006.01) | |
| *H01M 4/66* | (2006.01) | |
| *C25D 1/04* | (2006.01) | |
| *C22C 9/00* | (2006.01) | |
| *H01M 10/0525* | (2010.01) | |
| *C25D 7/06* | (2006.01) | |
| *C25D 3/38* | (2006.01) | |
| *C25D 11/38* | (2006.01) | |

(52) U.S. Cl.
CPC .............. *H01M 4/661* (2013.01); *C22C 9/00* (2013.01); *C25D 1/04* (2013.01); *C25D 7/0614* (2013.01); *H01M 10/0525* (2013.01); *C25D 3/38* (2013.01); *C25D 11/38* (2013.01); *H01M 2220/30* (2013.01); *Y10T 428/12431* (2015.01); *Y10T 428/24917* (2015.01)

(58) Field of Classification Search
None
See application file for complete search history.

(56) References Cited

U.S. PATENT DOCUMENTS

| | | |
|---|---|---|
| 3,857,681 A | 12/1974 | Yates et al. |
| 5,800,859 A | 9/1998 | Price et al. |
| 5,830,143 A | 11/1998 | Mistretta et al. |
| 8,343,657 B2 | 1/2013 | Minami et al. |
| 2007/0111103 A1 | 5/2007 | Konishiike et al. |
| 2012/0015206 A1 | 1/2012 | Kim et al. |

FOREIGN PATENT DOCUMENTS

| | | | |
|---|---|---|---|
| CN | 102168289 A | 8/2011 | |
| JP | S5339376 B1 | 10/1978 | |
| JP | H07-268678 A | 10/1995 | |
| JP | 2740768 B2 | 1/1998 | |
| JP | H10-096088 A | 4/1998 | |
| JP | H10-255768 A | 9/1998 | |
| JP | 2000-182623 A | 6/2000 | |
| JP | 2001-123289 A | 5/2001 | |
| JP | 2002-083594 A | 3/2002 | |
| JP | 3742144 B2 | 11/2005 | |
| JP | 3850155 B2 | 9/2006 | |
| JP | 2007-134272 A | 5/2007 | |
| JP | 2007-227328 A | 9/2007 | |
| JP | 2007-294923 A | 11/2007 | |
| JP | 2007294923 | * 11/2007 | ............... H05K 1/09 |
| JP | 2008-226800 A | 9/2008 | |
| JP | 2009-221592 A | 10/2009 | |
| JP | 2009-299100 A | 12/2009 | |
| JP | 2011-174146 A | 9/2011 | |
| JP | 2011174146 | * 9/2011 | ............... C25D 1/04 |
| JP | 2012-022939 A | 2/2012 | |
| WO | 1997-043466 A1 | 11/1997 | |
| WO | 2010-110205 A1 | 9/2010 | |
| WO | 2012002526 A1 | 1/2012 | |
| WO | WO2012002526 | * 1/2012 | ............ H01M 4/661 |

OTHER PUBLICATIONS

International Search Report for PCT/JP2013/067379, dated Oct. 8, 2013.
Office Action issued by SIPO (State Intellectual Property Office of the People's Republic of China) dated Oct. 29, 2015.
Office Action issued by KIPO (Korean Intellectual Property Office) dated Nov. 4, 2015.

* cited by examiner

*Primary Examiner* — Seth M Dumbris
(74) *Attorney, Agent, or Firm* — Kubotera & Associates, LLC

(57) ABSTRACT

Provided are an electrodeposited copper foil, a negative electrode that is for a lithium ion secondary battery, and a lithium ion secondary battery into which the electrode is incorporated. The electrodeposited copper foil exhibits good electrical conductivity and superior tensile strength, with no significant decline in tensile strength exhibited even after one hour of heating at 300° C. The negative electrode has heightened cycle properties due to the use of the electrodeposited copper foil as a current collector. Using x-ray diffraction, in the electrodeposited copper foil, in normal conditions, the diffraction intensity (I)<220> in the <220> orientation, the diffraction intensity (I)<200> in the <200> orientation, and the diffraction intensity (I)<111> in the <111> orientation, satisfy the following formula (1):

$$I{<}220{>}/\{I{<}220{>}+I{<}200{>}+I{<}111{>}\}{>}0.13 \qquad (1).$$

10 Claims, No Drawings

ELECTROLYTIC COPPER FOIL, NEGATIVE ELECTRODE FOR LITHIUM ION SECONDARY BATTERY, AND LITHIUM ION SECONDARY BATTERY

TECHNICAL FIELD

The present invention relates to an electrolytic copper foil or an electrodeposited copper foil and to a negative electrode for a lithium ion secondary battery, and a lithium ion secondary battery, which use the electrodeposited copper foil.

BACKGROUND ART

Lithium (Li) ion secondary batteries are, for example, configured to have a positive electrode, a negative electrode formed of a negative electrode active material layer on the surface of a negative electrode current collector, and a non-aqueous electrolyte, and are used in mobile phones, notebook type personal computers, and the like.

For example, the negative electrode of the lithium ion secondary battery is formed by coating, drying, and then pressing carbon particles as the negative electrode active material layer on the surface of a negative electrode current collector of which both surfaces are formed of a flat and smooth copper foil.

As the negative electrode current collector formed of copper foil described above, a negative electrode current collector manufactured by electrolysis is used, that is, a negative electrode current collector where an "unprocessed copper foil" is subjected to rust proofing.

As the negative electrode active material for lithium ion secondary batteries, development is underway of next generation negative electrode active materials having a charge and discharge capacity which greatly exceeds the theoretical capacity of carbon material.

For example, materials including metal capable of alloying with lithium such as silicon (Si), tin (Sn), or the like are expected.

However, in a case of using these active materials, since the changes in volume in accordance with the storage and release of lithium during charging and discharging are large, there are cases where it is difficult to favorably maintain an adhesion state between the current collector and the active material. As a result, the current collector is damaged and the cycle properties deteriorate. As countermeasures, setting the tensile strength of the current collector to a predetermined value or greater, or setting the elongation to a predetermined value or greater have been reported.

For example, a copper foil provided with a polyimide binder for improving the adhesion of the active material and the current collector and which suppresses the disadvantages described above is being developed.

However, the expansion and contraction of the active material is a micro-level phenomenon since the units thereof are the active material particles and the expansion and contraction of the active material does not have a simple correlation with the macro-level characteristics such as the tensile characteristics of the current collector. For this reason, it is difficult to further improve the cycle properties.

Patent Documents 1 to 12 describe an electrodeposited copper foil used in a negative electrode current collector of a lithium ion secondary battery, or the like.

PRIOR ART DOCUMENTS

Patent Documents

Patent Document 1: Japanese Patent No. 3742144B
Patent Document 2: Japanese Patent No. 3850155B
Patent Document 3: Japanese Unexamined Patent Application Publication No. H10-255768A
Patent Document 4: Japanese Unexamined Patent Application Publication No. 2002-083594A
Patent Document 5: Japanese Unexamined Patent Application Publication No. 2007-227328A
Patent Document 6: WO/2010/110205
Patent Document 7: Japanese Examined Patent Application Publication No. S53-39376B
Patent Document 8: Japanese Patent No. 2740768B
Patent Document 9: Japanese Unexamined Patent Application Publication No. H10-96088A
Patent Document 10: Japanese Unexamined Patent Application Publication No. 2009-221592A
Patent Document 11: Japanese Unexamined Patent Application Publication No. 2009-299100A
Patent Document 12: Japanese Unexamined Patent Application Publication No. 2007-134272A

SUMMARY OF THE INVENTION

Problems to be Solved by the Invention

The present invention has an object of providing an electrodeposited copper foil which exhibits good electrical conductivity and superior tensile strength, with no significant decline in tensile strength exhibited even after one hour of heating at 300° C., and a negative electrode for a lithium ion secondary battery, and a lithium ion secondary battery, which use the electrodeposited copper foil.

Means to Solve the Problem

In the electrodeposited copper foil of the present invention, using x-ray diffraction, in normal conditions, a diffraction intensity $I<220>$ in a $<220>$ orientation, a diffraction intensity $I<200>$ in a $<200>$ orientation, and a diffraction intensity $I<111>$ in a $<111>$ orientation, satisfy the following formula (1):

$$I<220>/\{I<220>+I<200>+I<111>\}>0.13 \tag{1}$$

In addition, in the electrodeposited copper foil of the present invention, using x-ray diffraction, in normal conditions, the diffraction intensity $I<220>$ in the $<220>$ orientation, the diffraction intensity $I<200>$ in the $<200>$ orientation, and the diffraction intensity $I<111>$ in the $<111>$ orientation, satisfy the following formula (2):

$$0.65>I<220>/\{I<220>+I<200>+I<111>\}>0.13 \tag{2}$$

In the electrodeposited copper foil of the present invention, in normal conditions, a tensile strength is preferably 450 MPa or greater.

In the electrodeposited copper foil of the present invention, in normal conditions, a tensile strength is preferably 500 MPa or greater.

In the electrodeposited copper foil of the present invention, a tensile strength after carrying out a heating process for one hour at 300° C. is preferably 400 MPa or greater.

In the electrodeposited copper foil of the present invention, in normal conditions, electrical conductivity is preferably 80% IACS or greater.

In the electrodeposited copper foil of the present invention, electrical conductivity after carrying out a heating process for one hour at 300° C. is preferably 85% IACS or greater.

A negative electrode for a lithium ion secondary battery of the present invention is a negative electrode where the electrodeposited copper foil of the present invention is set as a current collector.

In addition, a lithium ion secondary battery of the present invention is a secondary battery into which the electrodeposited copper foil of the present invention is incorporated as a current collector.

Effects of the Invention

According to the present invention, it is possible to provide an electrodeposited copper foil which exhibits good electrical conductivity and superior tensile strength, with no significant decline in tensile strength exhibited even after one hour of heating at 300° C.

In addition, it is possible to provide a negative electrode for a lithium ion secondary battery which has heightened cycle properties due to the use of the electrodeposited copper foil of the present invention as a current collector, and a lithium ion secondary battery into which the electrode is incorporated.

BEST MODE FOR CARRYING OUT THE INVENTION

[Configuration of Electrodeposited Copper Foil for Negative Electrode Current Collector for Lithium Ion Secondary Battery]

An electrodeposited copper foil for a negative electrode current collector for a lithium (Li) ion secondary battery of the present embodiment is an electrodeposited copper foil which configures a negative electrode current collector for a lithium ion secondary battery.

In the electrodeposited copper foil of the present embodiment described above, using x-ray diffraction, in normal conditions, a diffraction intensity I<220> thereof in a <220> orientation, a diffraction intensity I<200> thereof in a <200> orientation, and a diffraction intensity I<111> thereof in a <111> orientation, satisfy the following formula (1). The left side of the following formula (1) is a <220> orientation intensity ratio and the left side of the following formula (1) is described below as the <220> orientation intensity ratio.

$$I<220>/\{I<220>+I<200>+I<111>\}>0.13 \quad (1).$$

The copper which configures the electrodeposited copper foil is a face-centered cubic metal and, in the X-ray diffraction spectrum thereof, orientation peaks in Miller index where even numbers and odd numbers are mixed such as the <100> orientation and the <110> orientation do not occur in principle, due to the extinction rule.

On the other hand, the <200> orientation is equivalent to the <100> orientation and the <220> orientation is equivalent to the <110> orientation. Accordingly, the diffraction intensity I <220> of the <220> orientation of the X-ray diffraction is a numerical value relatively proportional to the area of the surface of the <110> orientation, in addition, the diffraction intensity I <200> of the <200> orientation is a numerical value proportional to the area of the surface of the <100> orientation. Accordingly, in an electrodeposited copper foil where the X-ray diffraction intensity satisfies formula (1) described above, it is shown that the crystal orientation is more aligned with the <110> orientation in comparison with an electrodeposited copper foil which does not satisfy formula (1), that is, where I<220>/{I<220>+I<200>+I<111>} is 0.13 or less.

That is, the left side of formula (1) described above shows that, as the <220> orientation intensity ratio is larger, the crystal orientation is more aligned with the <110> orientation. It is possible to treat the <220> orientation intensity ratio as a numerical value substantially indicating the <110> orientation intensity ratio, and, in the following, the <110> orientation intensity ratio is indicated by the left side of formula (1) described above.

In particular, when the orientation intensity ratio of the orientation <220> of the left side of formula (1) described above, that is, the <110> orientation intensity ratio, is 0.13 or greater to 0.65 or less as indicated below (formula 2), the adhesion to the active material is superior.

$$0.65>I<220>/\{I<220>+I<200>+I<111>\}>0.13 \quad (2).$$

In order to suppress damage to the current collector with respect to the micro-level expansion and contraction of the active material, in a current collector which has a polycrystalline structure, it is necessary to relax stress at sizes at the level of the crystal grains.

For copper foil, the Young's modulus of the <110> orientation is greater than the <100> orientation and less than the <111> orientation, and it was discovered that, for an electrodeposited copper foil having a moderate Young's modulus aligned with the <110> orientation, it is easy to relax the stress with respect to the expansion and contraction of the active material and that there is a tendency for the battery properties to be favorable. In addition, this tendency was more remarkable in the evaluation of batteries using an active material with a large volume expansion and contraction ratio such as Si or Sn. Accordingly, it is possible for the electrodeposited copper foil of the present embodiment to improve the cycle properties when configuring a lithium ion secondary battery as a result of it being easier to relax stress with respect to the expansion and contraction of the active material and damage to the electrode being suppressed.

Here, in a case where the <110> orientation ratio is the same, high strength and high electrical conductivity are desirable for a current collector since a current collector with a higher strength is harder to damage and a current collector with greater electrical conductivity has a smaller loss and a smaller rise in temperature.

For example, in the electrodeposited copper foil for a negative electrode current collector for a lithium ion secondary battery of the present embodiment, the tensile strength in normal conditions is preferably 450 MPa or greater, more preferably 500 MPa or greater.

In addition, for example, in the electrodeposited copper foil for a negative electrode current collector for a lithium ion secondary battery of the present embodiment, the tensile strength after carrying out a heating process for one hour at 300° C. is preferably 400 MPa or greater.

In addition, for example, in the electrodeposited copper foil for a negative electrode current collector for a lithium ion secondary battery of the present embodiment, the electrical conductivity in normal conditions is preferably 80% IACS or greater.

In addition, for example, in the electrodeposited copper foil for a negative electrode current collector for a lithium ion secondary battery of the present embodiment, the electrical conductivity after carrying out a heating process for one hour at 300° C. is preferably 85% IACS or greater.

In the present embodiment, normal conditions indicate a state at room temperature before performing a process such as a heating process for one hour at 300° C. as described above.

In addition, for example, in the electrodeposited copper foil for a negative electrode current collector for a lithium ion secondary battery of the present embodiment, a rust-proofing treated layer is provided on a surface provided with an active material layer of the electrodeposited copper foil.

The rust-proofing treated layer is, for example, an inorganic rust-proofing treated layer such as a chromate processed layer, or a layer where a chromate processed layer is further provided on various types of plating layers such as an Ni or Ni alloy plating layer, a Co or Co alloy plating layer, a Zn or Zn alloy plating layer, an Sn or Sn alloy plating layer; or an organic rust-proofing treated layer such as benzotriazole.

Furthermore, a silane coupling agent treated layer or the like may be formed.

The above inorganic rust proofing, organic rust proofing, and silane coupling agent treatment perform the role of increasing the adhesion strength to the active material, and preventing reduction in the charge-discharge cycle efficiency of the battery.

In addition, for example, in the electrodeposited copper foil for a negative electrode current collector for a lithium ion secondary battery of the present embodiment, a roughening treatment is carried out on the surface where the active material layer of the electrodeposited copper foil is provided and a rust-proofing treated layer is provided on the surface where the roughening treatment is carried out.

For example, it is preferable that a surface roughness Rz is 0.8 to 2.8 μm for both of an S-surface (glossy surface) and an M-surface (matte surface) of the electrodeposited copper foil, that 0.2% proof stress is 250 MPa or greater after carrying out a heating process at 200° C. to 400° C., and that the elongation be 2.5% or greater.

The heat resistance of the electrodeposited copper foil described above is increased and, when an active material layer is applied to the surface and set as a negative electrode of the lithium ion secondary battery, it is possible to favorably improve the adhesion of the active material and the current collector even when using a polyimide binder, and it is possible to reduce decreases in the charge-discharge cycle efficiency of the battery and suppress deformation such as wrinkles, damage, and the like as the current collector even when the current collector is subjected to stress due to the expansion and contraction of the active material layer in accordance with the storage and release of lithium.

[Method for Manufacturing Electrodeposited Copper Foil for Negative Electrode Current Collector for Lithium Ion Secondary Battery]

The electrodeposited copper foil for a negative electrode current collector for a lithium ion secondary battery of the present embodiment is manufactured by a method in which, for example, a sulfuric acid-copper sulfate aqueous solution is set as an electrolyte, the electrolyte is supplied between an insoluble anode formed of titanium covered with Platinum Group Metals or an oxide element thereof and a cathode drum made of titanium provided to oppose the anode, copper is deposited on the cathode drum-surface by passing a DC current between the electrodes while rotating the cathode drum at a constant speed, and the deposited copper is peeled from the cathode drum-surface and continuously wound.

It is possible to manufacture the electrodeposited copper foil for a negative electrode current collector for a lithium ion secondary battery of the present embodiment, for example, by performing an electrolysis process in the sulfuric acid-copper sulfate electrolyte plating solution.

For example, a range of 40 to 120 g/L is used as the copper concentration in the sulfuric acid-copper sulfate electrolyte plating solution, preferably, a range of 60 to 100 g/L is used.

In addition, for example, a range of 40 to 60 g/L is used as the sulfuric acid concentration in the sulfuric acid-copper sulfate electrolyte plating solution. The sulfuric acid concentration is an important condition. When the sulfuric acid concentration is below this range, the uniformity of the electrodeposition of the copper foil is decreased since the electrical conductivity of the plating solution is lowered, which is not preferable. When the sulfuric acid concentration is excessive, the effects of N (nitrogen) and S (sulfur)-containing additives as described below are not easily expressed, and decreases in the strength of the copper foil or randomization of the crystal orientation occur, which is not preferable.

For example, a range of 20 to 50 ppm is used as the chlorine concentration of the sulfuric acid-copper sulfate electrolyte plating solution. In addition, both of organic additives A and B shown below are used.

The organic additive A described above is an organic compound including at least one or more of each of an N (nitrogen) atom and an S (sulfur) atom in one molecule. By adding an appropriate amount of at least one type of the organic additive A, it is possible to form an electrodeposited copper foil which has a high strength and which is more aligned with the <110> orientation.

The organic additive A is desirably a thiourea-based compound, more desirably a thiourea-based compound with three or more carbon atoms.

As organic additives A, for example, it is possible to use one type or more of additives selected from thiourea or thiourea derivatives such as water-soluble thioureas or thiourea derivatives such as thiourea ($CH_4N_2S$), N,N'-dimethylthiourea ($C_3H_8N_2S$), N,N'-diethylthiourea ($C_5H_{12}N_2S$), tetramethylthiourea ($C_5H_{12}N_2S$), thiosemicarbazide ($CH_5N_3S$), and N-allylthiourea ($C_4H_8N_2S$), and ethylene thiourea ($C_3H_6N_2S$).

For the organic additive B described above, it is possible to use one type or more of additives selected from water-soluble polymer compounds such as, for example, glue, gelatin, polyethylene glycol, polypropylene glycol, starch, polymer polysaccharides such as cellulosic water-soluble polymers (carboxymethylcellulose, hydroxyethylcellulose, or the like), polyethylene imine, polyamine-based polymers, and polyacrylamide.

By further adding the organic additive B in addition to the organic additive A, it is possible to form an electrodeposited copper foil which has a higher strength and which is more aligned with the <110> orientation.

Furthermore, by adding transition metal elements to the sulfuric acid-copper sulfate electrolyte plating solution, it is possible to further improve the heat resistance. The metal elements to be added are desirably elements with stable oxide in the sulfuric acid acidic aqueous solution and more desirably elements which can stabilize trivalent or higher multivalent oxides.

With the method for manufacturing the electrodeposited copper foil of the present embodiment, it is possible to manufacture an electrodeposited copper foil capable of improving the cycle properties when configuring the lithium ion secondary battery as a result of having a moderate Young's modulus and being aligned with the <110> orientation into which it is hard for dislocations to be introduced, and stress with respect to the expansion and contraction of the active material being easily relaxed and damage being suppressed.

Here, in the present specification, the surface of the side where the electrodeposited copper foil contacts the cathode drum-surface during manufacturing is referred to as the S-surface (glossy surface) and the opposite surface is referred to as the M-surface (matte surface).

With respect to the manufactured electrodeposited copper foil (unprocessed copper foil), for example, an inorganic rust proofing such as, for example, chromate processing, or chromate processing, which is further carried out on layers with various types of plating such as Ni or Ni alloy plating, Co or Co alloy plating, Zn or Zn alloy plating, or Sn or Sn alloy plating, is carried out; or an organic rust proofing involving benzotriazole or the like is carried out.

Furthermore, for example, by carrying out a silane coupling agent treatment or the like, the electrodeposited copper foil may be used as the electrodeposited copper foil for a negative electrode current collector for a lithium ion secondary battery.

The inorganic rust proofing, the organic rust proofing, and the silane coupling agent treatment described above serve to increase the adhesion strength with the active material and prevent decreases in the charge-discharge cycle efficiency of the battery.

In addition, before carrying out the rust proofing described above, for example, a roughening treatment is performed on the electrodeposited copper foil surface. As the roughening treatment, for example, it is possible to favorably adopt a plating method, an etching method, or the like.

The plating method roughens the surface by forming a thin film layer having unevenness on the surface of the unprocessed electrodeposited copper foil. The plating method can be an electrolytic plating method or a non-electrolytic plating method.

As the roughening using the plating method, a method for forming a plated film, in which copper such as copper or a copper alloy is the main component, on the unprocessed electrodeposited copper foil surface, is preferable.

As a method for roughening by electroplating, for example, a roughening method using plating generally used with respect to copper foils for printed circuit, as disclosed in Patent Document 7, is preferably used.

That is, this method is a roughening method in which, after forming a powdered copper plating layer by so-called "burnt plating", "cover plating" is performed on the powdered copper plating layer so as not to adversely affect the uneven shape thereof, and, by depositing a substantially flat and smooth plating layer, the powdered copper is set as so-called "nodular copper".

As roughening using an etching method, for example, a method using physical etching or chemical etching is suitable. In physical etching, there are methods of etching such as sandblasting, and, in chemical etching, a large number of solutions which contain inorganic or organic acids, oxidizing agents, and additives have been proposed as treatment solutions. For example, Patent Document 8 discloses inorganic acid+hydrogen peroxide+a corrosion inhibitor (such as triazole)+a surfactant. In addition, Patent Document 9 discloses a solution containing inorganic acid+peroxide+azole+halide.

Normally a bath containing acid, oxidizing agent, and additives such as chelating agent or the like is used, and the crystal grain boundaries of the copper is preferentially dissolved. For example, in addition to the compositions disclosed in Patent Document 9, it is possible to employ commercial products such as CZ-8100 and CZ-8101 made by MEC Co., Ltd., and CPE-900 made by Mitsubishi Gas Chemical Co., Ltd.

[Configuration and Method for Manufacturing a Negative Electrode for a Lithium Ion Secondary Battery and a Lithium Ion Secondary Battery Using the Negative Electrode]

The negative electrode for the lithium ion secondary battery of the present embodiment has a configuration where the electrodeposited copper foil for a negative electrode current collector for a lithium ion secondary battery of the present embodiment described above is set as a current collector and an active material layer is formed on a surface on which the rust-proofing treated layer of the current collector is formed.

For example, the active material layer described above is a layer where a slurry in which the active material, a binder, and a solvent are kneaded is coated, dried, and pressed on the negative electrode current collector.

The active material layer in the present embodiment is a substance which stores and releases lithium and is preferably an active material which stores lithium by being alloyed therewith. Examples of the active material include carbon, silicon, germanium, tin, lead, zinc, magnesium, sodium, aluminum, potassium, indium, and the like. Of these, carbon, silicon, germanium, and tin are preferably used due to their high theoretical capacity. Accordingly, the active material layer used in the present embodiment is preferably a layer where carbon, silicon, germanium, or tin is set as the main component, in particular, silicon is an active material capable of being preferably employed in a lithium ion secondary battery where the electrodeposited copper foil of the present embodiment is set as the current collector.

As the binder, it is possible to use, for example, a polyimide binder.

In the present embodiment, the current collector is preferably thin and it is possible for the active material layer to be formed on one surface or both surfaces of the current collector.

For example, lithium may be stored or added in advance in the active material layer in the present embodiment. Lithium may be added when forming the active material layer. In other words, lithium is contained in the active material layer by forming the active material layer containing lithium. Also, after forming the active material layer, lithium may be stored in or added to the active material layer. An electrochemical method of storing or adding lithium can be used as the method of storing or adding lithium to the active material layer.

In addition, the lithium ion secondary battery of the present embodiment is a lithium ion secondary battery provided with a positive electrode and a negative electrode and the negative electrode is configured by the negative electrode of the lithium ion secondary battery of the present embodiment described above.

The non-aqueous electrolyte used in the lithium ion secondary battery of the present embodiment is an electrolyte in which a solute is dissolved in a solvent. There is no particular limitation on the solvent of the non-aqueous electrolyte provided it is a solvent used in lithium ion secondary batteries, but, for example, cyclic carbonates such as ethylene carbonate, propylene carbonate, butylene carbonate, vinylene carbonate, or chain carbonates such as dimethyl carbonate, diethyl carbonate, methyl ethyl carbonate, and the like can be used. Preferably, a solvent that is a mixture of cyclic carbonate and chain carbonate is used.

Also, a mixed solvent that includes the above cyclic carbonate and an etheric solvent such as 1,2-dimethoxyethane, 1,2-diethoxyethane, or a chain ester such as γ-butyrolactone, sulfolane, methyl acetate, and the like, may be used.

There is no particular limitation on the solute of the non-aqueous electrolyte provided it is a solute used in lithium ion secondary batteries, for example, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and the like. In particular, a solute mixture of $LiXFy$ (in the formula, X is P, As, Sb, B, Bi, Al, Ga, or In, and when X is P, As, or Sb, y is 6, and when X is B, Bi, Al, Ga, or In, y is 4) and lithium perfluoroalkylsulfonyl imide $LiN(C_mF_{2m+1}SO_2)(C_nF_{2n+1}SO_2)$ (in the formula, m and n are each independently an integer from 1 to 4) or lithium perfluoroalkyl sulfonate methide $LiC(C_pF_{2p+1}SO_2)(C_qF_{2q+1}SO_2)(C_rF_{2r+1}SO_2)$ (in the formula, p, q, and r are each independently an integer from 1 to 4) can be preferably used.

Of these, in particular, a solute mixture of $LiPF_6$ and $LiN(C_2F_5SO_2)_2$ can be preferably used.

In addition, as the non-aqueous electrolyte, it is possible to use, for example, a gel polymer electrolyte in which an electrolyte is impregnated in a polymer electrolyte such as polyethylene oxide, polyacrylonitrile, or polyvinylidene fluoride, or an inorganic solid electrolyte such as LiI or $Li_3N$.

It is possible for the electrolyte of the lithium ion secondary battery of the present embodiment to be used without restrictions as long as the lithium compound as the solute expressing ionic electrical conductivity and the solvent which dissolves and holds the lithium compound are not decomposed at a voltage during charging or discharging of the battery or during storage.

In addition, examples of the positive electrode active material used in the positive electrode include Li-containing transition metal oxides such as $LiCoO_2$, $LiNiO_2$, $LiMn_2O_4$, $LiMnO_2$, $LiCo_{0.5}Ni_{0.5}O_2$, and $LiNi_{0.7}Co_{0.2}Mn_{0.1}O_2$, or metal oxides which do not contain Li, such as $MnO_2$. In addition, apart from this, if the positive electrode active material is a substance which electrochemically inserts and desorbs Li, use is possible without restrictions.

A lithium ion secondary battery with improved cycle properties is possible as a result of the electrodeposited copper foil of the present embodiment having a moderate Young's modulus and being aligned with the <110> orientation into which it is hard for dislocations to be introduced, and stress being easily relaxed with respect to the expansion and contraction of the active material and damage being suppressed.

In a case of forming a conventional carbon-based active material layer configuring a negative electrode, for example, a paste formed of carbon, which is a negative electrode active material, a polyvinylidene fluoride resin, which is a binder, and N-methylpyrrolidone, which is a solvent, is made and then coated and dried on both surfaces of the copper foil.

In such a case, for example, drying is performed at a temperature of approximately 150° C. At a temperature of approximately 150° C., the tensile strength of the electrodeposited copper foil, the 0.2% proof stress, and the elongation hardly change. For example, the electrodeposited copper foil described in Patent Document 1 above, which is manufactured using a compound having a mercapto group in the copper sulfate-sulfuric acid electrolyte, chloride ions, and an electrolyte to which a low molecular weight glue with a molecular weight of 10,000 or less and polymer polysaccharide are added, has a tensile strength of 300 to 350 MPa at room temperature with 10 μm of foil; and, the performance thereof hardly changes even when drying is performed at a temperature of approximately 150° C.

Furthermore, in the case of the carbon active material described above, since the volume expansion thereof during charging and discharging is at most approximately 10%, remarkable reductions in the charge-discharge cycle efficiency and deformation of or damage to the current collector due to the charge and discharge do not occur.

In addition, for the electrodeposited copper foil described in Patent Document 2 described above manufactured from the copper sulfate-sulfuric acid electrolyte and with a thickness of 10 μm, the tensile strength at room temperature is approximately 570 MPa and the elongation is approximately 7%; however, when drying is performed at a temperature of approximately 150° C., the performance thereof changes, the tensile strength is approximately 230 MPa, and the elongation is approximately 25%. However, in the case of the carbon active material, since the volume expansion thereof during charging and discharging is at most approximately 10%, even with a foil where the tensile strength is reduced and the elongation is large as described above, remarkable reductions in the charge-discharge cycle efficiency and deformation of or damage to the current collector due to the charge and discharge do not occur.

In contrast, for example, in a case of using a silicon-based material including silicon as the active material, a polyimide-based resin may be used in the binder in order to prevent expansion and contraction in the active material during charging and discharging. In such a case, the drying and curing temperatures are higher than in a case of using a carbon-based active material and, for example, drying and curing are performed for approximately 0.5 to 1.5 hours at a temperature of approximately 200° C. to 400° C.

When the heating process is performed at a high temperature as described above, in the electrodeposited copper foil of Patent Document 1 and Patent Document 2 described above, the foil is annealed and softened, the charge-discharge cycle efficiency is remarkably reduced, and deformation and damage are easily generated in the foil due to expansion and contraction of the active material during charging and discharging.

In a case where the foil is plastically deformed, it can be considered that stress equal to or greater than the yield point was applied to the foil. The yield point is the stress at which there is a change from elasticity to plasticity. Even when stress in the region of elasticity is applied to the foil, only elastic deformation occurs, and there is no plastic deformation. However, in a case where stress in the region of plasticity is applied, plastic deformation occurs.

Accordingly, even after heating the foil by drying and curing, in a case where the yield point is large, the active material expands and contracts due to the charge and discharge, and it is possible to keep the plastic deformation amount small even in a case where stress is applied to the foil which is the current collector.

Accordingly, as described in Patent Document 6 described above, even when using an electrodeposited copper foil where the tensile strength is 400 MPa or greater and the elongation is 4.5% to 13% at room temperature, it cannot be said that deformation never occurs in the foil due to the expansion and contraction due to the charge and discharge. It can be said that a foil which has a large yield point even after heating by drying and curing is a foil where foil deformation does not easily occur.

Here, the yield point is measured using a tensile test, but in the case of electrodeposited copper foil, this point is not clear. In this case, the value at which a 0.2% strain is produced is normally used instead of the yield point. This is referred to as the 0.2% proof stress.

In the case of electrodeposited copper foil, having a large 0.2% proof stress at room temperature does not necessarily mean having a large yield point after heat treatment.

As described in Patent Document 6, even a material where the tensile strength is 400 MPa or greater at room temperature is not preferable in the case of a material where the 0.2% proof stress is reduced by being annealed by heating. It is important to have a constant value of 0.2% proof stress or greater after heating.

Also, if the elongation is low, the reduction in charge-discharge cycle efficiency tends to be large during many repetitions of the charge-discharge cycle.

In order to reduce the decrease in the charge-discharge cycle efficiency, it is preferable for the tensile strength to be 250 MPa or greater at 0.2% proof stress, and for the elongation to be 2.5% or greater.

When the charge-discharge cycle of a lithium ion secondary battery is repeated, the capacity retention ratio is reduced. The lower reduction in the capacity retention ratio (charge-discharge cycle efficiency), the greater the performance of the lithium ion secondary battery.

As factors influencing these characteristics, 0.2% proof stress and elongation have already been mentioned; however, apart from these, deterioration of the negative electrode active material itself, forming a coating on the surface of the active material due to decomposition of the electrolyde, cracking in the active material and peeling between the active material and the copper foil, and the like are other factors.

Of these, peeling between the active material and the copper foil is considered to be caused by the copper foil.

As causes of the peeling between the active material and the copper foil, the surface roughness is one factor in addition to the 0.2% proof stress and elongation.

A suitable range for the surface roughness is 0.8 to 2.8 μm in Rz. When Rz is below 0.8 μm, there is no effect, and even if Rz is set to 2.8 μm or greater, the effect is saturated and the capacity retention ratio during charging and discharging deteriorates instead. Therefore, it is effective to form the active material layer on an electrodeposited copper foil (current collector) having a surface roughness Rz from 0.8 to 2.8 μm.

In particular, as the electrodeposited copper foil, it is preferable to use an electrodeposited copper foil where the Rz is 0.8 to 2.8 μm for both the S-surface and the M-surface, the 0.2% proof stress is 250 MPa or greater, and the elongation is 2.5% or greater after a heating process at 200° C. to 400° C. as the current collector. Even under stress due to expansion and contraction of the active material thin film along with the storage and release of the lithium, it is possible to suppress decreases in the charge-discharge cycle efficiency of the battery, and deformation such as wrinkles, damage, and the like as the current collector.

As the electrodeposited copper foil for a current collector, with respect to decreases in the charge-discharge cycle efficiency of the battery, and deformation such as wrinkles and damage due to stress caused by expansion and contraction of the active material layer along with the storage and release of lithium, it is important that the Rz is 0.8 to 2.8 μm for both the S-surface and the M-surface and the 0.2% proof stress is 250 MPa or greater after a 0.5 to 1.5 hour heating process at 200° C. to 400° C. and also that the elongation is 2.5% or greater.

Even when Rz is 0.8 to 2.8 μm for both the S-surface and the M-surface and the 0.2% proof stress is 250 MPa or greater after a 0.5 to 1.5 hour heating process at 200° C. to 400° C., when the elongation is less than 2.5%, deformation such as wrinkles, damage, and the like are not generated as the current collector; however, a tendency for the decrease in the charge-discharge cycle efficiency of the battery to become large is seen.

In the present embodiment, for example, it is possible to measure the X-ray diffraction with an X-ray tube CuKα, a tube voltage of 40 kV, a tube current of 20 mA, a scanning method which is a θ-2θ method, and a measurement range of 20 deg to 100 deg.

In addition, in the present embodiment, the tensile strength is a value measured using a method defined in Japanese Industrial Standards (JIS Z 2241).

In addition, in the present embodiment, the electrical conductivity is defined in (JIS H 0505).

In addition, in the present embodiment, the surface roughness Rz is a ten point average roughness defined in Japanese Industrial Standards (JIS B 0601-1994).

In addition, in the present embodiment, the 0.2% proof stress and the elongation are values measured using a method defined in Japanese Industrial Standards (JIS K 6251).

EXAMPLES

Further detailed description will be given below of the present invention based on Examples; however, the present invention is not in any way limited to the following Examples and it is possible to carry out appropriate changes within a range which does not depart from the gist of the present invention.

[Manufacture of Unprocessed Copper Foil]

An electrolyte for manufacturing a foil was prepared by respectively adding additives with the compositions shown in Table 1 to an acidic copper electrolytic bath of copper 80 g/L-sulfuric acid 40 to 60 g/L. Here, in the Examples, all the chloride ion concentrations are adjusted to 30 ppm; however, the chloride ion concentration is appropriately changed according to the electrolysis conditions and is not limited to this concentration.

Using the prepared electrolyte, unprocessed copper foils of Examples 1 to 25 were manufactured using an electrolytic foil manufacturing method for manufacturing unprocessed copper foil with a thickness of 12 μm under conditions of a current density of 40 A/dm$^2$ and a bath temperature of 45° C. using a precious metal oxide coated titanium electrode for the anode and a rotating drum made of titanium for the cathode.

In addition, also in Comparative Examples 1 to 6, unprocessed copper foils were manufactured so as to be 12 μm using electrolytes with the compositions shown in Table 1.

Here, Comparative Example 5 is an electrodeposited copper foil created in accordance with Patent Document 10 and Comparative Example 6 is an electrodeposited copper foil created in accordance with Patent Document 11. Here, MPS is 3-mercapto-1-propanesulfonic acid sodium salt, 2M-5S is 2-mercapto-5-benzimidazole sulfonic acid, SPS is bis-(3-sulfopropyl)-disulfide, DDAC is diallyl dimethyl ammonium chloride, and EUR is N,N'-diethylthiourea.

TABLE 1

| Example | Additive (A) Type | Concentration ppm | Additive (B) Type | Concentration ppm | Cl Concentration ppm | Copper Concentration g/L | Sulfuric Acid Concentration g/L |
|---|---|---|---|---|---|---|---|
| 1 | Thiourea | 2 | Polyethylene glycol | 2 | 30 | 80 | 45 |
| 2 | Thiourea | 3 | Polyethylene glycol | 2 | 30 | 80 | 55 |
| 3 | Thiourea | 6 | Polyarylamine | 2 | 30 | 80 | 45 |
| 4 | N-allythiourea | 6 | Polyarylamine | 2 | 30 | 80 | 50 |
| 5 | Ethylene thiourea | 6 | Polyarylamine | 2 | 30 | 80 | 60 |
| 6 | Thiourea | 5 | Polyethylene glycol | 10 | 30 | 80 | 47 |
| 7 | Thiourea | 5 | Hydroxyethylcellulose | 12 | 30 | 80 | 49 |
| 8 | Thiourea | 5 | Polyacrylamide | 8 | 30 | 80 | 41 |
| 9 | N,N'-dimethylthiourea | 5 | Polyethylene glycol | 10 | 30 | 80 | 57 |
| 10 | N,N'-dimethylthiourea | 5 | Hydroxyethylcellulose | 12 | 30 | 80 | 59 |
| 11 | N,N'-dimethylthiourea | 5 | Polyacrylamide | 8 | 30 | 80 | 51 |
| 12 | Tetramethylthiourea | 5 | Polyethylene glycol | 10 | 30 | 80 | 42 |
| 13 | Tetramethylthiourea | 5 | Hydroxyethylcellulose | 12 | 30 | 80 | 44 |
| 14 | Tetramethylthiourea | 5 | Polyarylamine | 8 | 30 | 80 | 46 |
| 15 | Ethylene thiourea | 6 | Polyethyleneimine | 15 | 30 | 80 | 52 |
| 16 | Ethylene thiourea | 6 | Polyethylene glycol | 12 | 30 | 80 | 54 |
| 17 | Ethylene thiourea | 5 | Hydroxyethylcellulose | 12 | 30 | 80 | 56 |
| 18 | Ethylene thiourea | 5 | Polyarylamine | 8 | 30 | 80 | 58 |

| Comparative Example | Additive Type | Concentration ppm | Additive Type | Concentration ppm | Cl Concentration ppm | Copper Concentration g/L | Sulfuric Acid Concentration g/L |
|---|---|---|---|---|---|---|---|
| 1 | Tetramethylthiourea | 5 | Polyethylene glycol | 10 | 30 | 80 | 145 |
| 2 | Ethylene thiourea | 5 | Gelatin | 12 | 30 | 80 | 145 |
| 3 | — | — | — | — | 30 | 80 | 90 |
| 4 | MPS | 5 | Gelatin | 12 | 30 | 80 | 50 |

| Comparative Example | Additive Type and Concentration | Cl Concentration ppm | Copper Concentration g/L | Sulfuric Acid Concentration g/L |
|---|---|---|---|---|
| 5 | 2M-5S 31.3 ppm + SPS 73.0 ppm + DDAC 64.1 ppm | 65.7 | 80 | 150 |
| 6 | DDAC 70 ppm + SPS 60 ppm + EUR 3 ppm | 60 | 80 | 150 |

[Measurement of Tensile Strength and Electrical Conductivity of Electrodeposited Copper Foil]

The tensile strength Ts (MPa), the 0.2% proof stress (MPa), the elongation (%), and the electrical conductivity EC (% IACS (International Annealed Copper Standard)) were measured at room temperature of each of the electrodeposited copper foils (Examples 1 to 18 and Comparative Examples 1 to 6). The results are shown in Table 2.

In addition, for the tensile strength Ts (MPa), the 0.2% proof stress (MPa), the elongation (%), and the electrical conductivity EC (% IACS), measurement was carried out after performing the heating process for one hour at 300° C. The results are shown in Table 2.

In addition, the ten point average surface roughnesses Rz (μm) of the S-surface and the M-surface of each of the electrodeposited copper foils (Examples 1 to 18 and Comparative Examples 1 to 6) were measured. The results are shown in Table 2.

Here, the tensile strength is a value measured using a tensile tester (Model 1122 manufactured by Instron Co.), the electrical conductivity is a value measured according to JIS H 0505, the surface roughness Rz (μm) is a ten point average roughness as defined in JIS B 0601-1994, and the 0.2% proof stress and the elongation are values measured using methods defined in JIS K 6251.

[Measurement of <110> Orientation Intensity Ratio]

The X-ray diffraction spectrum of each of the electrodeposited copper foils (Examples 1 to 18 and Comparative Examples 1 to 6) was measured.

Here, using an X-ray apparatus manufactured by Rigaku Denki Co. as the measuring apparatus, the X-ray tube was CuKα, the tube voltage was 40 kV, the tube current was 20 mA, the scanning method was a θ-2θ method, and the measurement range was 20 deg to 100 deg.

From each of the diffraction intensities I<220>, I<200>, and I<111> of the obtained X-ray diffraction spectrum, I<220>/{I<220>+I<200>+I<111>} was calculated as the <110> orientation intensity ratio.

The results are shown in Table 2.

TABLE 2

| | I<220>/{I<200> + I<220> + I<111>} | | | Room Temperature | | | | After Heating | | | | Rz | |
|---|---|---|---|---|---|---|---|---|---|---|---|---|---|
| | <110> Intensity Ratio | Capacity Retention Ratio % | Evaluation | Ts MPa | 0.2% Proof Stress Mpa | Elongation % | EC % IACS | Ts MPa | 0.2% Proof Stress Mpa | Elongation % | EC % IACS | S-surface μm | M-surface μm |
| Example | | | | | | | | | | | | | |
| 1 | 0.13 | 70 | ○ | 465 | 395 | 5.4 | 76 | 352 | 308 | 7.6 | 89 | 1.98 | 2.03 |
| 2 | 0.26 | 72 | ○ | 487 | 414 | 5.2 | 78 | 365 | 310 | 7.3 | 87 | 1.99 | 2.03 |

TABLE 2-continued

| | ↓ I<220>/{I<200> + I<220> + I<111>} | | | Room Temperature | | | | After Heating | | | | | |
|---|---|---|---|---|---|---|---|---|---|---|---|---|---|
| | <110> Intensity Ratio | Capacity Retention % | Evaluation | Ts MPa | 0.2% Proof Stress Mpa | Elongation % | EC % IACS | Ts MPa | 0.2% Proof Stress Mpa | Elongation % | EC % IACS | Rz S-surface μm | Rz M-surface μm |
| 3 | 0.3 | 75 | ⊚ | 524 | 482 | 4.7 | 85 | 416 | 318 | 7.0 | 86 | 1.56 | 2.03 |
| 4 | 0.41 | 79 | ⊚ | 586 | 507 | 4.2 | 83 | 421 | 336 | 7.2 | 86 | 1.54 | 2.02 |
| 5 | 0.36 | 78 | ⊚ | 595 | 499 | 4.3 | 82 | 435 | 322 | 6.7 | 85 | 1.45 | 1.98 |
| 6 | 0.47 | 82 | ⊚ | 649 | 561 | 3.2 | 86 | 427 | 371 | 6.0 | 87 | 1.89 | 1.90 |
| 7 | 0.45 | 81 | ⊚ | 642 | 547 | 3.4 | 85 | 422 | 368 | 5.5 | 87 | 1.86 | 1.91 |
| 8 | 0.41 | 75 | ⊚ | 600 | 516 | 4.2 | 80 | 389 | 333 | 6.6 | 83 | 1.63 | 1.65 |
| 9 | 0.5 | 81 | ⊚ | 642 | 552 | 3.4 | 85 | 422 | 361 | 5.9 | 87 | 1.90 | 1.25 |
| 10 | 0.48 | 79 | ⊚ | 628 | 543 | 3.6 | 83 | 411 | 353 | 5.6 | 86 | 1.96 | 1.87 |
| 11 | 0.44 | 76 | ⊚ | 607 | 525 | 4.1 | 81 | 395 | 343 | 7.0 | 84 | 1.49 | 1.53 |
| 12 | 0.44 | 83 | ⊚ | 656 | 564 | 3.1 | 86 | 432 | 372 | 5.4 | 88 | 1.22 | 1.32 |
| 13 | 0.42 | 82 | ⊚ | 649 | 555 | 3.2 | 86 | 427 | 369 | 5.6 | 87 | 1.64 | 1.67 |
| 14 | 0.4 | 81 | ⊚ | 642 | 554 | 3.4 | 85 | 422 | 364 | 5.6 | 87 | 1.30 | 1.39 |
| 15 | 0.69 | 87 | ⊚ | 684 | 557 | 2.5 | 78 | 484 | 385 | 4.2 | 93 | 1.58 | 2.50 |
| 16 | 0.67 | 85 | ⊚ | 670 | 516 | 2.8 | 79 | 473 | 382 | 5.4 | 92 | 1.56 | 2.45 |
| 17 | 0.65 | 84 | ⊚ | 663 | 569 | 2.9 | 87 | 438 | 377 | 4.2 | 89 | 1.89 | 1.32 |
| 18 | 0.63 | 83 | ⊚ | 656 | 566 | 3.1 | 86 | 432 | 370 | 5.8 | 88 | 1.87 | 1.91 |
| Comparative Example | | | | | | | | | | | | | |
| 1 | 0.10 | 64 | X | 693 | 562 | 2.5 | 71 | 388 | 327 | 4.6 | 76 | 1.53 | 3.31 |
| 2 | 0.09 | 60 | X | 662 | 554 | 3.1 | 73 | 378 | 302 | 5.3 | 77 | 1.53 | 2.58 |
| 3 | 0.09 | 56 | X | 408 | 345 | 8.2 | 95 | 205 | 169 | 10.0 | 98 | 1.58 | 3.66 |
| 4 | 0.08 | 55 | X | 312 | 265 | 10.2 | 99 | 220 | 183 | 13.5 | 99 | 1.45 | 1.41 |
| 5 | 0.10 | 55 | X | 786 | 624 | 1.4 | 34 | 450 | 328 | 4.1 | 40 | 1.57 | 3.04 |
| 6 | 0.10 | 54 | X | 483 | 418 | 6.7 | 58 | 365 | 310 | 8.4 | 66 | 1.42 | 1.35 |

[Chromate Processing]

With respect to Examples 1 to 18 and Comparative Examples 1 to 6, a rust-proofing treated layer was formed and set as a current collector by carrying out chromate processing.

The conditions of the chromate processing of the copper foil surface are as follows.

Chromate processing conditions:
Potassium bichromate: from 1 to 10 g/L
Immersion processing time: from 2 to 20 seconds

[Manufacture of Negative Electrode for Lithium Secondary Battery]

A negative electrode mixture was adjusted by mixing at a ratio of 90 mass % of a powdered Si alloy-based active material (average particle diameter 0.1 μm to 10 μm) and 10 mass % of a polyimide-based binder as a binder and an active material slurry was set by dispersing the negative electrode mixture in N-methylpyrrolidone (solvent).

Next, the slurry was applied on both surfaces of a strip-shaped electrodeposited copper foil with a thickness of 12 μm manufactured in the Examples and Comparative Examples and then compressed and formed by a roller press after drying to form a strip-shaped negative electrode. This strip-shaped negative electrode was formed so that the film thickness of the negative electrode mixture after molding was the same at 90 μm on both sides and so that the width and length were 55.6 mm and 551.5 mm, respectively.

[Manufacture of Positive Electrode for Lithium Secondary Battery]

0.5 mole lithium carbonate and 1 mole cobalt carbonate were mixed and calcined at 900° C. in air for five hours to obtain a positive electrode active material ($LiCoO_2$).

A positive electrode mixture was made by mixing at a ratio of 91 mass % of this positive electrode active material ($LiCoO_2$), 6 mass % of graphite as a conductive agent, and 3 mass % of polyvinylidene fluoride as a binder and this positive electrode mixture was dispersed in N-methyl-2-pyrrolidone to form a slurry.

Next, this slurry was applied uniformly to both sides of a positive electrode current collector made of a strip of aluminum with a thickness of 20 μm and then compression-molded with a roller press after drying to obtain a strip-shaped positive electrode with a thickness of 160 μm. This strip-shaped positive electrode was formed so that the film thickness of the positive electrode mixture after molding was 70 μm on both surfaces and so that the width and length were 53.6 mm and 523.5 mm, respectively.

[Manufacture of Lithium Secondary Battery]

The strip-shaped positive electrode and the strip-shaped negative electrode manufactured as described above are laminated with a separator formed of a microporous polypropylene film with a thickness of 25 μm and a width of 58.1 mm to form a laminated electrode body. Regarding this laminated electrode body, the negative electrode is wound many times in a spiral form to the inside along the length direction thereof and the final end section of the separator is fixed with tape at the outermost periphery to form a spiral electrode body. The hollow portion of this spiral-shaped electrode body was formed with an inner diameter of 3.5 mm and an outer shape of 17 mm.

In a state where an insulating plate is installed on both upper and lower surfaces of the manufactured spiral-shaped electrode body, the manufactured spiral-shaped electrode body is accommodated in a battery can made of iron and plated with nickel and a positive electrode lead made of aluminum leading from the positive electrode current collector is connected with the battery cover and a negative electrode lead made of nickel leading from the negative electrode current collector is connected with the battery can in order to perform current collection in the positive electrode and the negative electrode.

5.0 g of a non-aqueous electrolyte, in which LiPF$_6$ was dissolved at a ratio of 1 mol/l in an equal volume mixed solvent of propylene carbonate and diethyl carbonate, was introduced into the battery can accommodating the spiral-shaped electrode body. Next, the battery cover was fixed by caulking the battery can via an insulating sealing gasket coated with an asphalt surface so as to maintain the airtightness inside the battery can.

By so doing, a cylindrical lithium secondary battery with a diameter of 18 mm and a height of 65 mm was manufactured.

[Measurement of Capacity Retention Ratio by Charge and Discharge Test]

For the secondary batteries of the manufactured Examples 1 to 18 and Comparative Examples 1 to 6, charge and discharge test was performed under a condition of 25° C. and the capacity retention ratio of the 50th cycle with respect to the 2nd cycle was calculated. At that time, after performing charging until the battery voltage reached 4.2 V at a set current density of 1 mA/cm$^2$, charging was performed until the current density reached 0.05 mA/cm$^2$ at a set voltage of 4.2 V, and discharging was performed until the battery voltage reached 2.5 V at a set current density of 1 mA/cm$^2$.

Here, when performing the charging, the utilization rate of the capacity of the negative electrode was 90% and metal lithium was not deposited on the negative electrode.

The capacity retention ratio was calculated as the ratio of the discharge capacity of the 50th cycle with respect to the discharge capacity of the 2nd cycle, that is, as (discharge capacity of 50th cycle/discharge capacity of 2nd cycle)×100.

The results of the measured capacity retention ratio are shown in Table 2. In addition, the evaluation with respect to the capacity retention ratio is shown in Table 2. As evaluation, ⊚ is particularly good, ○ is good, and x is poor.

As shown in Table 2, Examples 3 to 18 were favorable with a <110> orientation intensity ratio greater than 0.13, a tensile strength of 400 MPa, and electrical conductivity of 75% IACS or greater at room temperature and after the heating process, and the capacity retention ratios thereof were also favorable.

Here, for Examples 1 and 2, the <110> orientation intensity ratio was greater than 0.13; however, the tensile strength after the heating process was slightly insufficient. However, as long as the tensile strength after the heating process was 350 MPa or greater, the capacity retention ratio was favorable as an electrode for a lithium secondary battery formed of a normal active material with electrical conductivity, 0.2% proof stress, elongation, and the like, and the evaluation was ○ (good).

On the other hand, for Comparative Examples 1 to 6, since the <110> orientation intensity ratio was less than 0.13, excesses or deficiencies occurred in the tensile strength, the electrical conductivity, the 0.2% proof stress, the elongation and the like after the heating process, the capacity retention ratio was poor, and the evaluation was x (poor).

Here, for Comparative Example 4, despite $I_{220}/I_{200}$ defined in Patent Document 12 being 2.5 or less to 0.03 or greater, I<220>/{I<220>+I<200>+I<111>}>0.13 defined in the present specification was not satisfied, the tensile strength was low at 320 MPa or less, and the capacity retention ratio was poor.

[Evaluation of Negative Electrode Active Material Adhesion]

Furthermore, evaluation of the active material adhesion was carried out as follows with respect to Examples 1, 3, 9, 18, 16, and 15 out of the secondary batteries of the manufactured Examples 1 to 18.

Each of the electrodes was cut into a 10 mm×60 mm piece as a test piece and fixed such that negative electrode active material coating surface was up and the copper foil surface was down. Next, tape was stuck onto the negative electrode active material surface and the peel strength was measured when the stuck tape was peeled from the end in a direction at 90° thereto at a speed of 50 mm/min. The measurement was carried out five times and the average values of each of the values are shown in Table 3 as the adhesion strength (N/m). From Table 3, the <110> orientation intensity ratio of Examples 1, 3, 9, and 18 was 0.65 or less, and the active material adhesion was more favorable with an adhesion strength of 30 N/m or greater.

However, Examples 15 and 16 had a <110> orientation intensity ratio of 0.65 or greater and the adhesion strength was 30 N/m or less; however, these Examples were in a range where there were no practical problems.

The overall determination of each of the Examples is shown in the evaluation columns of Table 3 as ⊚ -particularly good, and ○-good.

Under conditions where the <110> orientation intensity ratio was greater than 0.65, the surface roughness Rz was greater (refer to Table 2) and it is considered that the unevenness was not preferable with respect to the active material adhesion.

TABLE 3

| | | | | | | | | ↓I<220>/{I<200> + I<220> + I<111>} | | |
|---|---|---|---|---|---|---|---|---|---|---|
| Example | Additive (A) Type | ppm | Additive (B) Type | ppm | Cl Concentration ppm | Copper Concentration ppm | Sulfuric Acid Concentration g/L | <110> Intensity Ratio | Active material Adhesion N/m | Evaluation |
| 1 | Thiourea | 2 | Polyethylene glycol | 2 | 30 | 80 | 45 | 0.16 | 31 | ⊚ |
| 3 | Thiourea | 6 | Polyarylamine | 2 | 30 | 80 | 45 | 0.3 | 33 | ⊚ |
| 9 | N,N'-dimethylthiourea | 5 | Polyethylene glycol | 10 | 30 | 80 | 57 | 0.5 | 35 | ⊚ |
| 18 | Ethylene thiourea | 5 | Polyarylamine | 8 | 30 | 80 | 58 | 0.63 | 36 | ⊚ |
| 16 | Ethylene thiourea | 6 | Polyethylene glycol | 12 | 30 | 80 | 54 | 0.67 | 28 | ○ |
| 15 | Ethylene thiourea | 6 | Polyethylene imine | 15 | 30 | 80 | 52 | 0.69 | 23 | ○ |

Here, the present embodiment described a case where the active material of the negative electrode was silicon; however, even in a case of using an active material mainly composed of oxide of silicon, carbon, germanium, or tin, it is possible to suppress the generation of deformation such as wrinkles in the current collector due to the charge and discharge, it is possible to prevent short circuiting in the positive electrode and the negative electrode of the lithium ion secondary battery, and it is possible to provide a compact lithium ion secondary battery with a long lifetime where decreases in the capacity retention ratio do not occur even when the charge-discharge cycle is repeated.

What is claimed is:

1. An electrodeposited copper foil for a lithium ion secondary battery, wherein, using x-ray diffraction, in normal conditions, a diffraction intensity I<220> thereof in a <220> orientation, a diffraction intensity I<200> thereof in a <200> orientation, and a diffraction intensity I<111> thereof in a <111> orientation, satisfy the following formula (1):

$$I<220>/\{I<220>+I<200>+I<111>\} \geq 0.30 \quad (1)$$

in normal conditions, a tensile strength thereof is 450 MPa or greater, and in normal conditions, electrical conductivity thereof is 80% IACS or greater measured right after the electrodeposited copper foil is manufactured with an electrolytic method.

2. The electrodeposited copper foil for a lithium ion secondary battery according to claim 1, wherein, in normal conditions, a tensile strength thereof is 500 MPa or greater.

3. The electrodeposited copper foil for a lithium ion secondary battery according to claim 1, wherein a tensile strength thereof after a heating process of one hour at 300° C. is 400 MPa or greater.

4. The electrodeposited copper foil for a lithium ion secondary battery according to claim 1, wherein electrical conductivity thereof after a heating process of one hour at 300° C. is 85% IACS or greater.

5. The electrodeposited copper foil for a lithium ion secondary battery according to claim 2, wherein a tensile strength thereof after a heating process of one hour at 300° C. is 400 MPa or greater.

6. The electrodeposited copper foil for a lithium ion secondary battery according to claim 2, wherein electrical conductivity thereof after a heating process of one hour at 300° C. is 85% IACS or greater.

7. An electrodeposited copper foil for a lithium ion secondary battery, wherein, using x-ray diffraction, in normal conditions, a diffraction intensity I<220> thereof in a <220> orientation, a diffraction intensity I<200> thereof in a <200> orientation, and a diffraction intensity I<111> thereof in a <111> orientation, satisfy the following formula (2):

$$0.65 > I<220>/\{I<220>+I<200>+I<111>\} \geq 0.30 \quad (2)$$

in normal conditions, a tensile strength thereof is 450 MPa or greater, and in normal conditions, electrical conductivity thereof is 80% IACS or greater measured right after the electrodeposited copper foil is manufactured with an electrolytic method.

8. The electrodeposited copper foil for a lithium ion secondary battery according to claim 7, wherein, in normal conditions, a tensile strength thereof is 500 MPa or greater.

9. The electrodeposited copper foil for a lithium ion secondary battery according to claim 7, wherein a tensile strength thereof after a heating process of one hour at 300° C. is 400 MPa or greater.

10. The electrodeposited copper foil for a lithium ion secondary battery according to claim 7, wherein electrical conductivity thereof after a heating process of one hour at 300° C. is 85% IACS or greater.

* * * * *